(12) United States Patent
Hamon

(10) Patent No.: US 6,233,139 B1
(45) Date of Patent: May 15, 2001

(54) DISPLAY APPARATUS

(75) Inventor: Olivier Hamon, Crolles (FR)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/401,168

(22) Filed: Sep. 21, 1999

(30) Foreign Application Priority Data

Sep. 21, 1998 (EP) .................................................. 98402340

(51) Int. Cl.[7] ........................................................ G06F 1/16
(52) U.S. Cl. ........................ 361/681; 361/725; 312/223.2; 248/918
(58) Field of Search .................................... 361/681, 682, 361/724–727; 248/917–925; 345/169, 905; 312/223.1–223.6

(56) References Cited

U.S. PATENT DOCUMENTS

| 4,669,694 | * | 6/1987 | Malick | 248/397 |
| 5,668,570 | | 9/1997 | Ditzik | 345/173 |
| 5,708,561 | | 1/1998 | Huilgol et al. | 361/681 |
| 6,081,420 | * | 6/2000 | Kim et al. | 361/681 |

* cited by examiner

Primary Examiner—Leo P. Picard
Assistant Examiner—Hung Van Duong

(57) ABSTRACT

Display apparatus comprising a support member and a display member having a display surface, the display member being responsive to an electrical signal to display an image on the display surface and being provided with a pivot mechanism arranged between the support member and the display member which allows the display member to be movable from a first rest position to at least a second rest position, characterized in that the pivot mechanism is arranged to provide in the movement between the first and second rest positions a rotation about an axis extending in a direction generally perpendicular to the display surface and a translation in a direction generally parallel to the display surface.

11 Claims, 5 Drawing Sheets

DISPLAY APPARATUS

FIELD OF THE INVENTION

The present invention relates to display devices for use with computers, particularly but not exclusively, to flat panel displays of the type which are rotatable about an axis generally perpendicular to a display surface.

BACKGROUND OF THE INVENTION

Many types and configurations of display devices are known for use with computers. For various reasons, some of these have been pivotably mounted on a support structure. For instance, CRT monitors are often provided with tilt/swivel stands so that the position of the display can be adjusted for ergonomic reasons. In this case, the degree of permitted rotation is often very limited.

However, CRT monitors and flat panel displays have been proposed, and are becoming increasing popular, which are rotatable about an axis that is generally perpendicular to the display screen so that the screen can be viewed in either a landscape or portrait mode, see for instance U.S. Pat. No. 4,542,377 and U.S. Pat. No. 5,329,289.

This latter feature is used in wordprocessing and other office applications, enabling a full screen display of A4 page format on 14–15" screen diagonal.

Whilst existing systems of this type are no doubt satisfactory, they are not optimized from an ergonomic standpoint since generally they only provide a fixed central pivot point. In consequence, unless the monitor stand is provided with manual cabinet height adjustment, the height of the cabinet at landscape position would be too high if the cabinet is not to be stopped by the desktop or the base of the stand when rotating to portrait position.

Furthermore, the landscape and portrait positions in known systems are not simultaneously compatible with the well-established ergonomic rule that display height is well adjusted when the upper edge of the display screen is at eye level so that it is viewed perpendicularly by the user.

Even it the monitor stand is provided with a height adjustment mechanism, the user has twice to adjust the cabinet height when rotating the display—once to prevent it to be stopped by the desktop and a second time to comply with the ergonomic rule mentioned above.

As in normal use such displays are rotated quite often, this combination of movement and adjustment has been found to be somewhat inconvenient.

This invention aims to mitigate the above drawbacks of the prior art.

SUMMARY OF THE INVENTION

In brief, this is achieved by display apparatus comprising a support member and a display member having a display surface, the display member being responsive to an electrical signal to display an image on the display surface. A pivot mechanism is arranged between the support member and the display member which allows the display member to be movable from a first rest position, for instance a landscape orientation, to at least a second rest position, for instance a portrait orientation, the pivot mechanism being arranged to provide in the movement between the first and second rest positions a rotation about an axis extending in a direction generally perpendicular to the display surface and a translation in a direction generally parallel to the display surface.

In this way, an automatic height compensation can be provided on movement of the display device from one position to the other.

In preferred embodiments, the pivot mechanism comprises a cam surface for guiding movement of the display member between the first and second rest positions. The cam surface can be shaped to provide a raised position for the display member between the first and second rest positions. The rectangular display member as a whole is thereby raised during rotational movement to provide greater clearance between the lower corners of the display member and the desktop or other horizontal surface upon which it may be standing.

In particularly preferred embodiments, the pivot mechanism is arranged so that in normal use the upper edge of the screen is at the same height in the first and second rest positions—thereby enabling the display screen to remain ergonomically well-adjusted in both positions without intervention or manual adjustment by the user.

Advantageously, the apparatus can be provided with resilient biasing means for at least partially supporting the weight of the display member during movement of the display member from the first rest position to the second rest position.

It will be appreciated that the above described arrangements also have manufacturing cost advantages, since in many embodiments it may be possible to dispense with the manual height adjustment mechanisms conventionally provided in support stands for such displays.

Whilst the above described arrangement is particularly suitable for flat panel displays, its use with CRT displays or any other type of display apparatus is not excluded.

BRIEF DESCRIPTION OF THE DRAWINGS

A display system embodying the invention will now be described, by way of non-limiting example, with reference to the accompanying diagrammatic drawings, in which.

BEST MODES OF CARRYING OUT THE INVENTION

Figure 1:
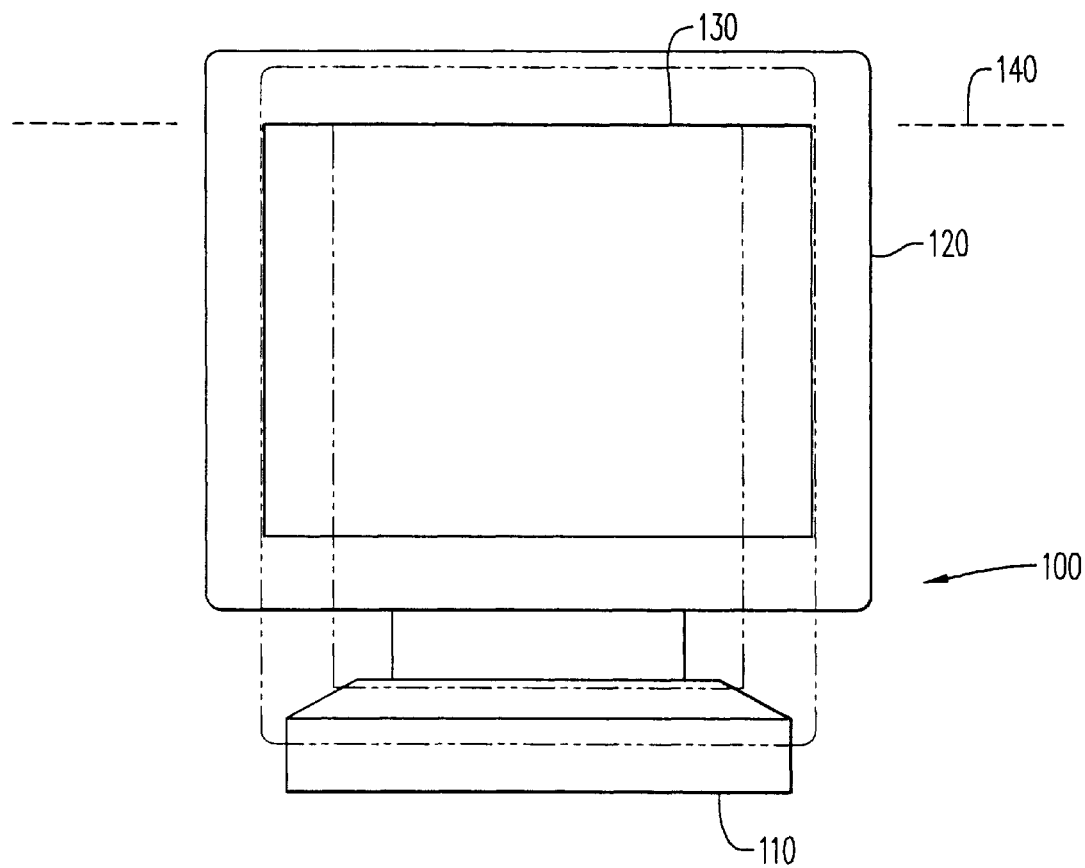
FIG. 1 is a front view of display apparatus with a display member in landscape and portrait orientations.

Referring to FIG. 1, there is shown flat panel display apparatus 100 comprising support stand 110 and display member 120 having a display screen 130. Display member 120 is of conventional flat-panel type which has for instance a VGA input for receiving an electrical input to display a corresponding image on the display screen.

Display apparatus 100 is provided with a pivot mechanism arranged between the support stand and the display member which allows the display member to be movable from a landscape orientation (shown by a solid line in FIG. 1) to a portrait orientation (shown by a broken line in FIG. 1). The pivot mechanism is arranged to provide in the movement between the landscape and portrait orientations, not only a rotation about an axis extending in a direction generally perpendicular to the display screen, but also a vertical translation parallel to the display surface so that the upper edge of the display screen 130 at the same height (represented by dotted line 140) in both the landscape and portrait orientations.

Figures 2A, 2B:
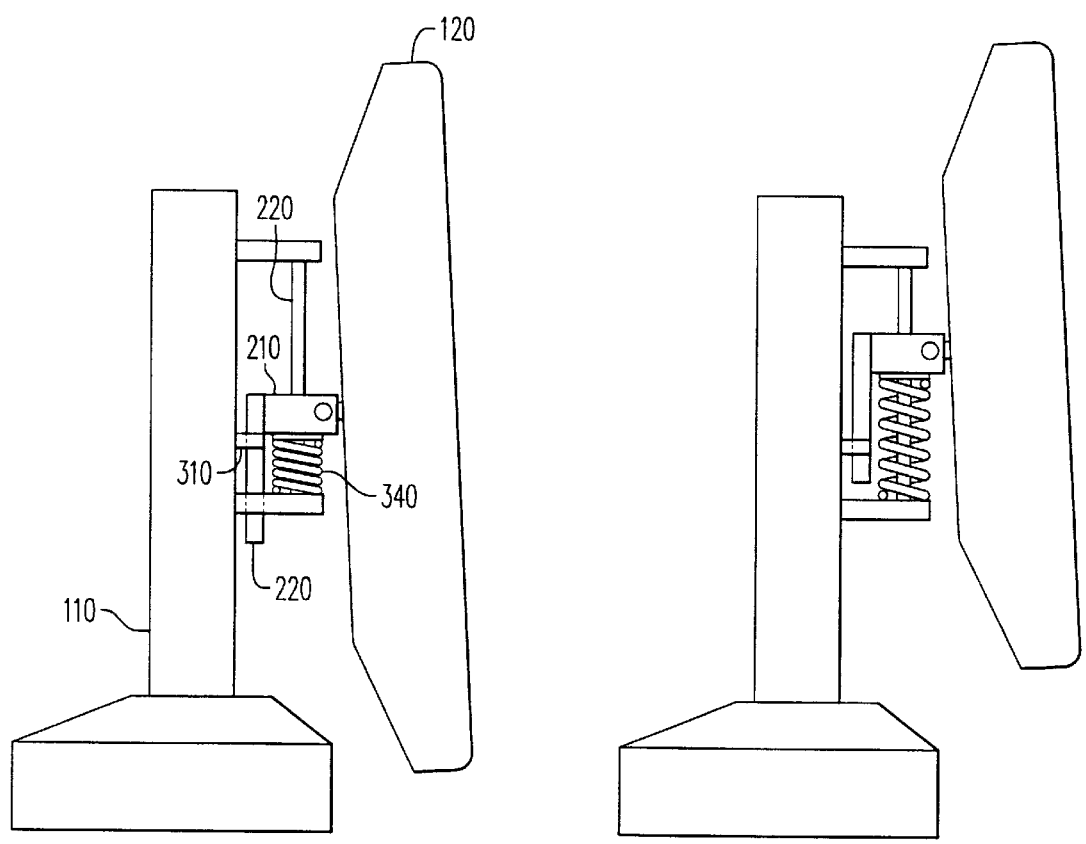
FIGS. 2a and b are two side views of display apparatus in a first embodiment of the invention.
Figure 3:
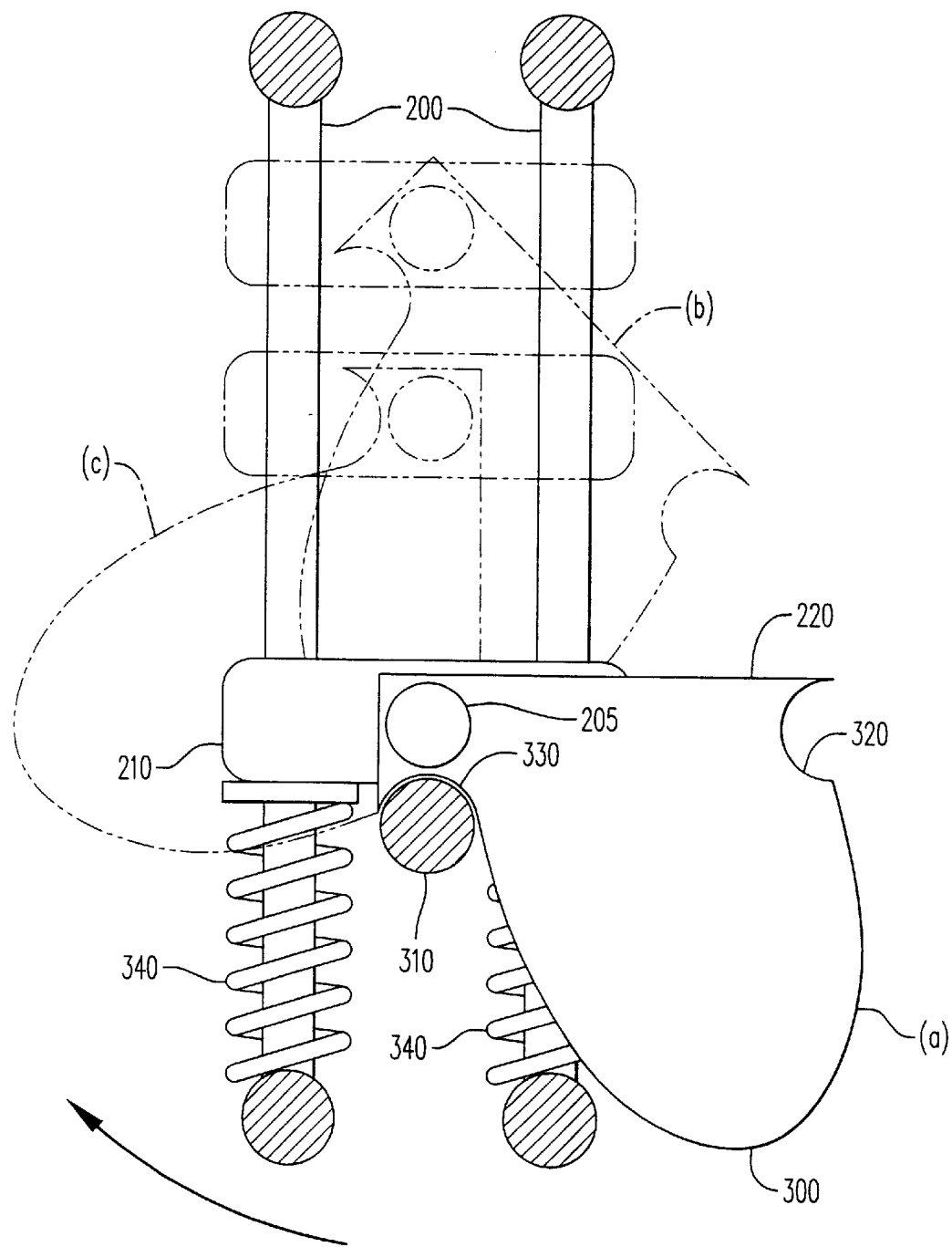
FIG. 3 is a view of the pivot mechanism of the first embodiment of the invention.

Referring to FIGS. 2 and 3 there is shown a first embodiment of the pivot mechanism supporting display member 120. FIGS. 2a and 2b are side views showing the portrait and landscape orientations respectively. FIG. 3 is a view of the pivot mechanism viewed outwards from the support stand.

In this first embodiment, display member 120 is mounted on a slider 210 which slides on a pair of vertical rails 200 which themselves are fixed to support stand 110. Display member 120 is fixedly attached, via an axle 205 passing through slider 210, to a cam member 220. Display member 120 and cam member 220 are thus pivotably mounted on slider 210. Cam member 220 has a cam surface 300 which acts against stop member 310, which itself is fixed to support stand 110, in order to guide the movement of the display member 200 between the landscape and portrait orientations. Notches 320 and 330 serve to define rest positions for the display member in the different orientations.

The different positions a, b and c of cam member 220 are shown in outline in FIG. 3, positions a and c being the rest positions in the landscape and portrait orientations. Cam member 220 is shaped to provide a raised position (position b) between the rest positions to enable greater clearance between the lower corner of display member 120 and any horizontal surface upon which the display apparatus may be standing.

In this first embodiment, springs 340 are provided to assist the movement of the display member by supporting its weight during movement of the display member from the portrait to landscape orientations.

Figures 4A, 4B:
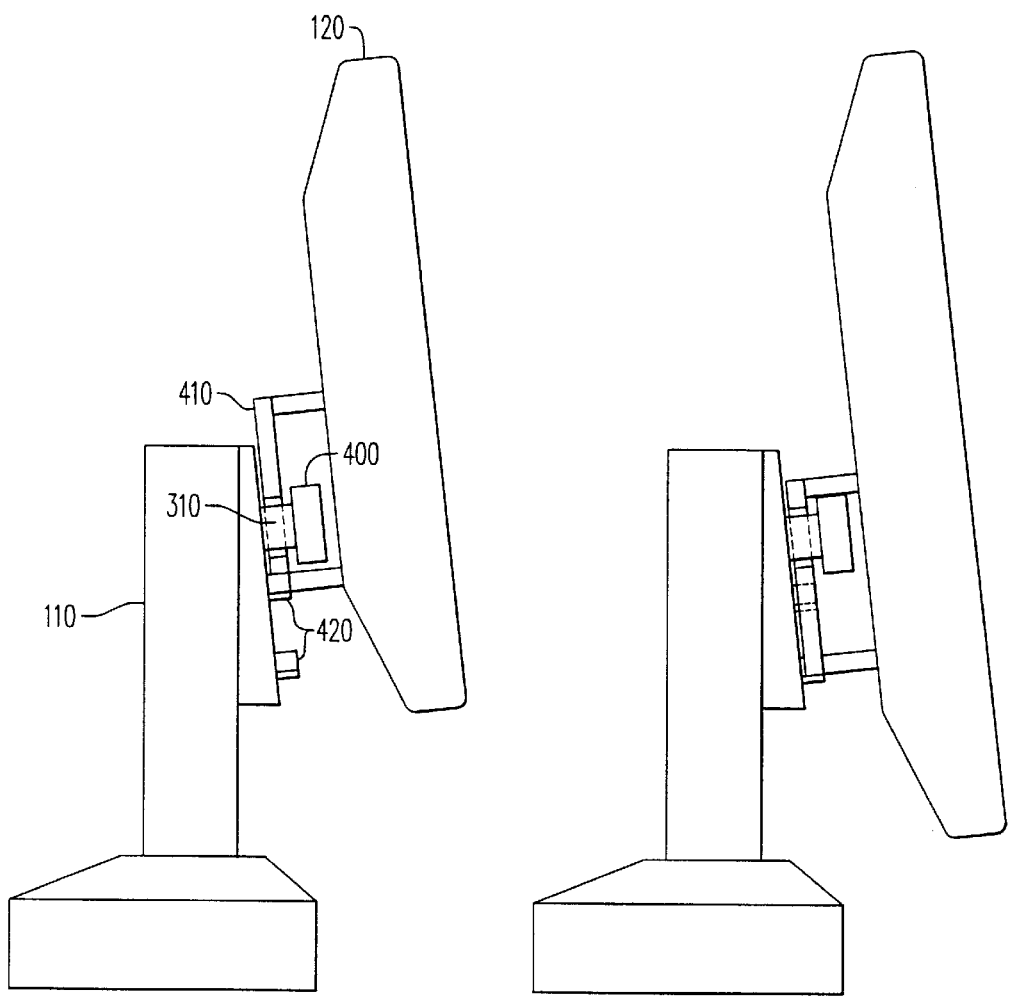
FIGS. 4a and b are two side views of display apparatus in a second embodiment of the invention.
Figure 5:
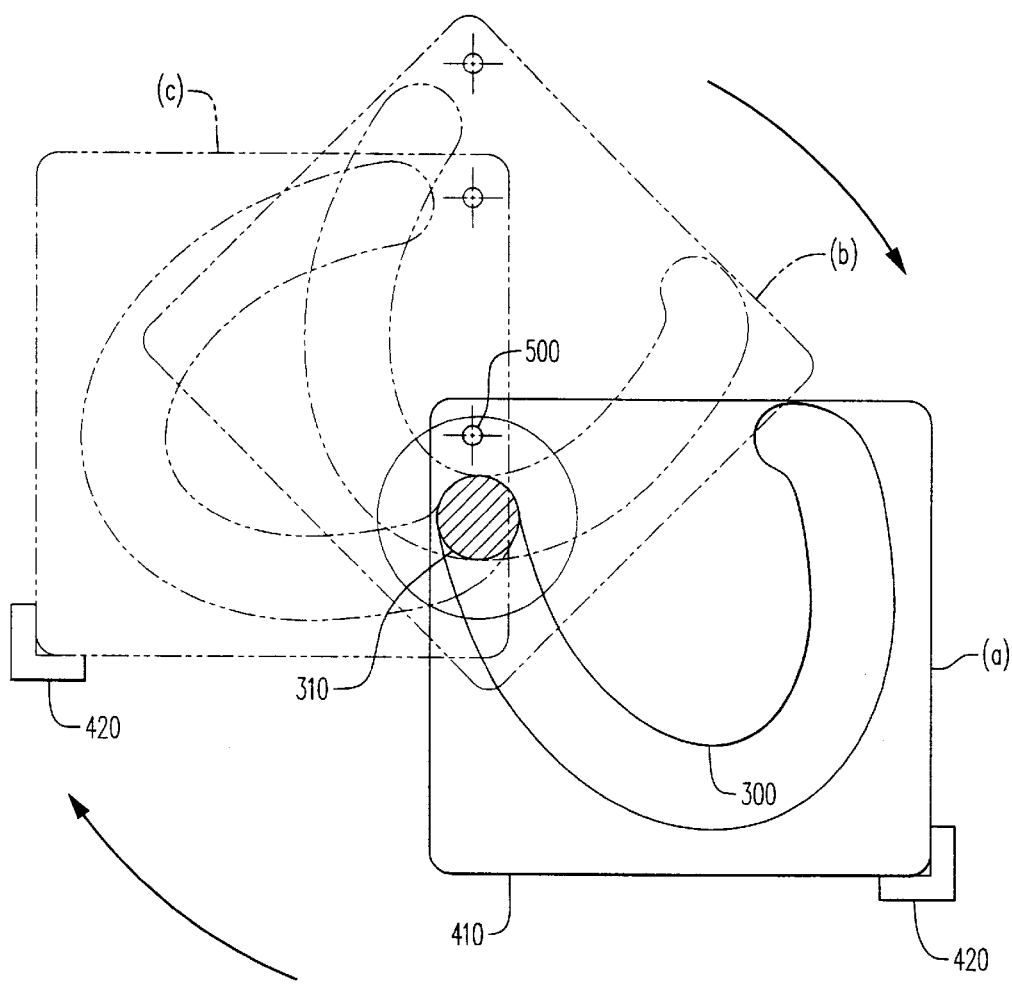
FIG. 5 is a view of the pivot mechanism of the second embodiment of the invention.

Referring to FIGS. 4 and 5 there is shown a second embodiment of the pivot mechanism supporting display member 120. As before, FIGS. 4a and 4b are side views showing the portrait and landscape orientations respectively. FIG. 5 is a view of the pivot mechanism viewed outwards from the support stand.

In the second embodiment, cam surface 300 is provided via one side of a slot in a plate 410 which is fixed to the display member. Plate 410 is positioned eccentrically with respect to the centre of the display screen—represented by cross 500 in FIG. 5. Stop member 310 protrudes through the slot and is held in place by boss 400 provided on the end of stop member 310. On movement of display member 120 from the portrait orientation to the landscape orientation, stop 310 slides in the slot and plate 410 rotates about stop 310. Two angled protrusions 420 on support stand 110 serve to support plate 410 in the rest positions.

The different positions a, b and c of plate 410 are shown in outline in FIG. 5, positions a and c being the rest positions in the landscape and portrait orientations. The slot in plate 410 is shaped to provide a raised position (position b) between the rest positions to enable greater clearance between the lower corner of display member 120 and any horizontal surface upon which the display apparatus may be standing.

It will be appreciated that suitable resilient biasing means may also easily be provided to support the weight of the display member during its movement.

It will be appreciated that the pivot arrangement according to the invention may be provided either integrated in the display member or in the support stand or can be provided as an independent device fixable between the support stand and display member. The embodiments described have illustrated a system in which the monitor is moved manually from vertical to horizonatal orientations, although it would be also possible to motorize this movement if required.

Although specific embodiments of the invention have been described, the invention is not to be limited to the specific arrangement so described. The invention is limited only by the claims.

What is claimed is:

1. Display apparatus comprising a support member and a display member, the display member having a generally rectangular display screen and being responsive to an electrical signal to display an image on the display screen, the apparatus being provided with a pivot mechanism arranged between the support member and the display member which allows the display member to be movable from a first rest position to at least a second rest position wherein in the first rest position the display screen has a landscape orientation and in the second rest position the display screen has a portrait orientation, the pivot mechanism being arranged to provide in the movement between the first and second rest positions a rotation about an axis extending in a direction generally perpendicular to the display surface and a translation in a direction generally parallel to the display surface and generally vertical in normal use of the apparatus so that the center of the display screen is lower in the second rest position than in the first rest position.

2. Display apparatus as claimed in claim 1, wherein the pivot mechanism comprises a cam surface for guiding movement of the display member between the first and second rest positions.

3. Display apparatus as claimed in claim 1, wherein the pivot mechanism comprises resilient biasing means supporting the weight of the display member during movement of the display member from the first rest position to the second rest position.

4. Display apparatus as claimed in claim 1 wherein the pivot mechanism is arranged so that in normal use the upper edge of the screen is at the same height in the first and second rest positions.

5. Display apparatus as claimed in claim 1 wherein the display member is a flat panel display.

6. Display apparatus as claimed in claim 2 wherein the cam surface is shaped to provide a raised position for the display member between the first and second rest positions.

7. A mounting accessory for display apparatus, the accessory being fixable between a support member and a display member having a generally rectangular display screen, the accessory comprising a pivot mechanism that allows the display member to be movable from a first rest position to at least a second rest position wherein in the first rest position the display screen has a landscape orientation and in the second rest position the display screen has a portrait orientation, the pivot mechanism being arranged to provide in the movement between the first and second rest positions, a rotation about an axis extending in a direction generally perpendicular to the display surface and a translation in a direction generally parallel to the display surface and generally vertical in normal use of the apparatus to that the center of the display screen is lower in the second rest position than in the first rest position.

8. A mounting accessory as claimed in claim 7 wherein the pivot mechanism comprises a cam surface for guiding movement of the display member between the first and second rest positions.

9. A mounting accessory as claimed in claim 7 wherein the pivot mechanism comprises resilient biasing means for at least partially supporting the the weight of the display memeber during movement of the display member from the first rest position to the second rest position.

10. A mounting accessory as claimed in claim 7 wherein the pivot mechanism is arranged so that in normal use the upper edge of the screen is at the same height in the first and second rest position.

11. A mounting accessory as claimed in claim 8 wherein the cam surface is shaped to provide a raised position for the display member between the first and second rest position.

* * * * *

UNITED STATES PATENT AND TRADEMARK OFFICE
CERTIFICATE OF CORRECTION

PATENT NO. : 6,233,139 B1  
DATED : May 15, 2001  
INVENTOR(S) : Olivier Hamon

Page 1 of 1

It is certified that error appears in the above-identified patent and that said Letters Patent is hereby corrected as shown below:

Claim 7,
Line 48, delete "to" and insert -- so --.

Claim 9,
Line 56, delete "the the" and insert -- the --.
Line 57, delete "memeber" and insert -- member --.

Claim 10,
Line 62, delete "position" and insert -- positions --.

Signed and Sealed this

Fifth Day of February, 2002

Attest:

JAMES E. ROGAN  
*Director of the United States Patent and Trademark Office*

*Attesting Officer*